Fig. 1a.

Inventor:
George L. Rogers,
by Harry E. Dunham
His Attorney.

Patented Sept. 8, 1942

2,295,293

UNITED STATES PATENT OFFICE 2,295,293

ELECTRIC SYSTEM AND INDICATING CIRCUIT THEREFOR

George L. Rogers, Schenectady, N. Y., assignor to General Electric Company, a corporation of New York Original application July 31, 1941, Serial No. 404,853. Divided and this application March 16, 1942, Serial No. 434,944

8 Claims. (Cl. 171—95)

My invention relates to electric translating systems and more particularly to an indicating circuit therefor.

This application is a division of my copending patent application Serial No. 404,853, entitled Electric welding system, filed July 31, 1941, and which is assigned to the assignee of the present application. Certain broad features of the energy storage and dissipation system and the associated control apparatus are disclosed and claimed in the copending parent patent application Serial No. 404,853.

In energy storage systems, such as capacitance energy storage systems wherein a capacitance is charged and discharged to effect energization of a load circuit, it is frequently desirable to provide means for accurately indicating the state of energization of the capacitance. In accordance with the teachings of my invention, I provide a new and improved indicating circuit for systems of this nature.

It is an object of my invention to provide a new and improved indicating circuit.

It is another object of my invention to provide a new and improved electric valve indicating circuit.

It is a further object of my invention to provide a new and improved indicating circuit for electric translating apparatus of the energy storage type.

Briefly stated, in the illustrated embodiment of my invention I provide a new and improved indicating circuit for a capacitor discharge type welding system wherein the magnitude of the direct voltage applied to the capacitance is accurately indicated. The indicating system is provided with a damping circuit comprising a capacitance and a resistance which are connected to a unidirectional conducting device or an electric valve which is poled to transmit current in response to a voltage of a predetermined polarity of the first mentioned capacitance. The indicating device or instrument is connected across the damping circuit.

For a better understanding of my invention, reference may be had to the following description taken in connection with the accompanying drawings, and its scope will be pointed out in the appended claims. Figs. 1a, 1b and 1c considered conjointly, diagrammatically illustrate an embodiment of my invention as applied to a welding machine which is energized from a polyphase alternating current supply circuit. Referring to the accompanying drawings and considering Figs. 1a, 1b and 1c arranged in a line from left to right in the order named, my invention is there diagrammatically illustrated as applied to an electric valve translating system for energizing a welding machine 1. The welding machine 1 comprises welding electrodes 2 and 3, the latter of which may be operated upon by actuating means, such as a fluid operated piston, for controlling the pressure exerted on the work by means of a conventional ram structure. The piston (not shown) may be housed in a cylinder 4 to which an actuating fluid, such as air, is supplied by means of conduits 5 and exhausted therefrom by means of a conduit 6. The pressure exerted on the work may be controlled by means of a solenoid 7 which may control a valve mechanism (not shown).

Figure 1A:
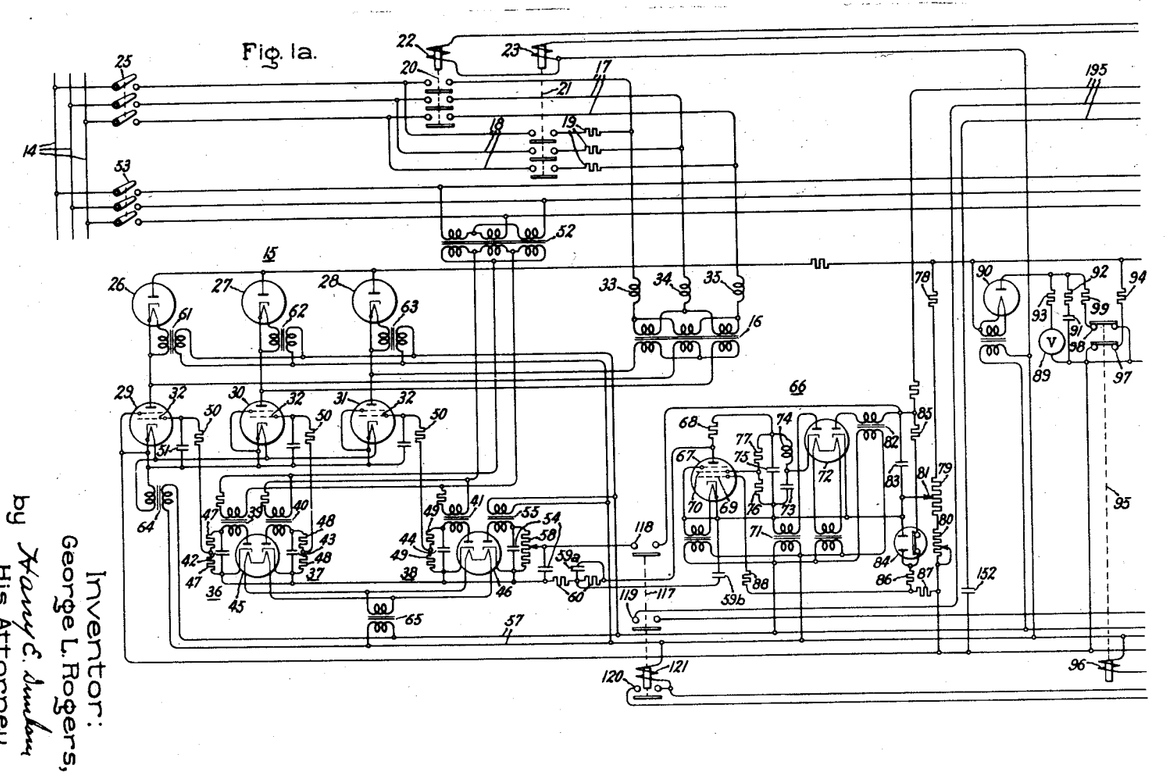
Figure 1B:
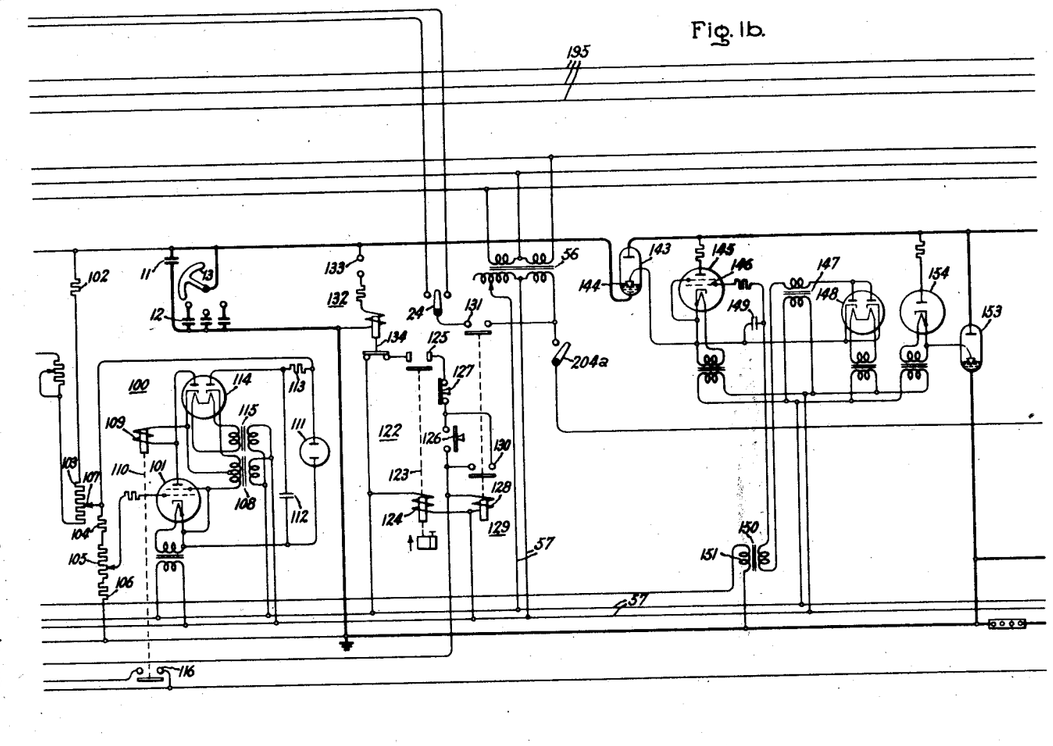
Figure 1C:
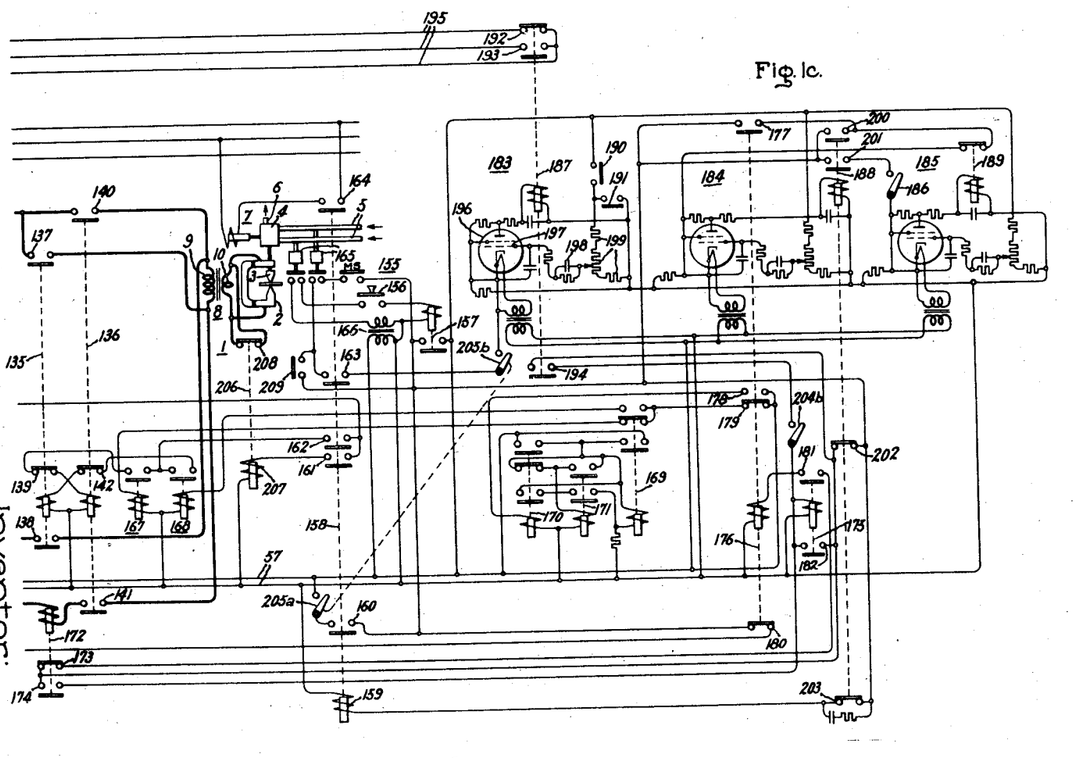

The welding machine 1 includes a transformer 8 provided with a magnetic core structure and having a primary winding 9 and a secondary winding 10 which is connected to the electrodes 2 and 3. The welding machine 1 is energized by transmitting thereto impulses of current and these impulses of current are, of course, transmitted to the welding electrodes 2 and 3. I employ suitable energy storage means, such as a capacitance 11, which is charged by means of a rectifier described hereinafter. In order to provide a flexible system wherein the magnitude of the capacitance is adjustable and, hence, to control the amount of power transmitted to the welding machine, I provide a plurality of capacitances 12 which may be selectively connected in the system by means of a switch 13.

The capacitance 11 is charged from an alternating current supply circuit 14 through apparatus including a rectifying means 15 and a transformer 16. I provide a plurality of circuits connected between the supply circuit 14 and the transformer 16 and having different impedances in order to charge the capacitance 11 at different rates. For example, I may employ a plurality of charging circuits 17 and 18, the latter of which has a substantially higher impedance than the former by virtue of resistances 19 which are connected in series with the primary windings of transformer 16. Suitable circuit controlling means, such as switches 20 and 21, provided with actuating coils 22 and 23, selectively connect the circuits 17 and 18 to the primary windings of transformer 16. Selective energization of actuating coils 22 and 23 may be obtained by means of a selector switch 24. A manually operated switch 25 may be connected in series relation with circuits 17 and 18 to connect these circuits to the supply circuit 14.

The rectifying means 15 and associated control circuit may be of the type disclosed and claimed in a copending patent application Serial No. 398,807, of Orrin W. Livingston, filed June 19, 1941, and which is assigned to the assignee of the present application. This rectifying means may comprise a plurality of pairs of rectifiers arranged for full wave rectification. If desired, one rectifier of each pair, such as rectifiers 26, 27 and 28, may be of the uncontrolled type, and rectifiers 29, 30 and 31 may be of the controlled type each having a control member or a grid 32 the potential of which determines the amount of current conducted thereby and, hence, controls the rate at which the capacitance 11 is charged. I provide in series relation with the primary windings of transformer 16 reactors 33, 34 and 35 which limit the maximum current transmitted by rectifying means 15 and hence limit the maximum rate at which the capacitance 11 may be charged. In this manner, the load imposed on the alternating current supply circuit 14 is also limited.

I provide excitation circuits 36, 37 and 38 for the rectifiers 29—31, inclusive, which are of the type disclosed and claimed in the above-identified patent application and which control the conductivities of the rectifiers 29—31 throughout a region of substantially 240 electrical degrees of the voltage of the supply circuit 14. The control of the conductivities of the rectifiers 29—31 is obtained by impressing on the grids 32 a resultant voltage composed of two components, one of which is a direct current biasing component the magnitude and polarity of which vary, and the other of which is a periodic voltage of substantially triangular wave form. The direct current or unidirectional component is varied by means of apparatus described hereinafter and controls the charging current transmitted to the capacitance 11. Each of the excitation circuits 36—38 includes means for producing a periodic voltage of triangular wave form and includes transformers 39—41 which charge capacitances 42—44, respectively, through electric discharge paths furnished by apparatus described hereinafter. Each of the capacitances 42—44 is charged through a unidirectional conducting path which paths are provided by electric valves 45 and 46. The capacitances are discharged by means of circuits connected thereacross and which include resistances 47, 48 and 49. Points of the resistances are connected to the grids 32 of rectifiers 29—31 through current limiting resistances 50. Capacitances 51 may be connected between the cathodes and the grids 32 in order to absorb extraneous transient voltages. Excitation circuits 36—38, inclusive, are energized from the alternating current supply circuit 14 through a transformer 52 and a switch 53.

The electric valve 46 may be provided with two discharge paths, one of which may be employed as a rectifying path of a rectifier circuit which is energized by means of a transformer 55. Filtering capacitances 54 are connected across a voltage divider including a resistance 58. Transformer 55 may be energized from an intermediate circuit 57 which in turn is energized from the supply circuit 14 through transformer 56. Capacitance 59a is connected across one of the resistances 60 to limit the rate of rise of the voltage impressed on grids 32 of rectifiers 29—31, during the operation when the rectifying means 15 is rendered conducting, thereby preventing an excessive charging rate of the capacitance 11 when the value thereof is relatively small. Capacitance 59b is connected between the common juncture of the resistances 60 and the cathode of the electric discharge device 67 and tends to bias the rectifiers 29—31 to cut-off before the circuit 66 operates if the rate of rise of the voltage of capacitance 11 is too rapid, thereby preventing overshooting of the capacitance voltage for small values of capacitive reactance. In this manner, the operation of the circuit 66 is stabilized. Cathode heating transformers 61—65, inclusive, may also be energized from circuit 57.

I provide a control circuit 66 for controlling the magnitude and polarity of the biasing potential impressed on grids 32 of rectifiers 29—31 and thereby control the rate at which the capacitance 11 is charged. The control circuit 66 includes an electric discharge device 67 which transmits variable amounts of current through the resistance 68 and, hence, controls the magnitude of the voltage difference between the cathodes and grids 32 of the rectifiers 29—31. Electric discharge device 67 may be provided with a control grid 69 and a screen grid 70. A suppressor grid may also be employed and may be connected to the cathode. Unidirectional current for energizing the anode-cathode circuit of electric discharge device 67 may be provided by a rectifier circuit including a transformer 71 and an electric valve 72 which charges a capacitance 73. A suitable filter circuit including inductance 74 and a capacitance 75 may be connected across the output circuit of the rectifier, and a predetermined component of the output voltage may be impressed on screen grid 70 through a voltage divider including resistances 76 and 77. The potential of the control grid 69 is controlled in response to the difference between a positive reference voltage and a predetermined negative component of the voltage of capacitance 11 to vary the magnitude of the biasing potential impressed on grids 32 of rectifiers 29—31. The electric discharge device 67 is initially biased to cut-off during the early portion of the charging period of the capacitance 11, and consequently permits the rectifiers 29—31 to conduct a greater amount of current during the early portion of the charging period. As the voltage of capacitance 11 rises, the electric discharge device 67 conducts increased amounts of current and consequently lowers the biasing potential from a positive value to a negative value and decreases the conductivity of the rectifiers 29—31. This control may be obtained by means of the voltage divider comprising resistances 78, 79 and 80 which are connected across the capacitance 11 and which produce a predetermined negative component of voltage the magnitude of which varies in accordance with the voltage of the capacitance. Resistance 79 is provided with an adjustable contact 81 to provide a controllable component of voltage which is compared with the constant reference voltage, and which establishes the voltage to which capacitance 11 is charged. As a means for producing a constant positive reference voltage, I provide a rectifier including a transformer 82 which charges a capacitance 83 through one of the discharge paths of the electric valve 72. I connect a suitable constant voltage device, such as a glow discharge valve 84, in series relation with a resistance 85 across the capacitance 83, and the lower terminal of the glow discharge valve 84 is connected to the lower terminal of resistance 80 through resistances 86 and 87. The common juncture of resistances 86 and 87 is connected to control grid 69 through a current limiting resistance 88. The rectifier which energizes capacitance 83 also serves as a source of negative unidirectional biasing potential which may be impressed on the grids 32 through relay apparatus described hereinafter, and which maintains the rectifying means 15 nonconducting during the discharge period of the capacitance 11.

A suitable voltage indicating means, such as a voltmeter 89, may be connected to be responsive to the voltage of the capacitance 11. In order to stabilize the operation of the voltmeter 89, I provide a circuit including a rectifier 90 which is connected to charge a capacitance 91 through a resistance 92. The voltmeter 89 is connected across the latter two elements through a resistance 93. In view of the fact that the voltage of the capacitance 11 varies greatly during its operation, it has become important to provide some means for limiting the rate of change of the voltage appearing across the voltmeter and for providing some means for suppressing the magnitude of the negative voltage of the capacitance during the discharge interval. The rectifier 90 acting in conjunction with capacitance 91 produces a unidirectional component of voltage the magnitude of which is representative of the magnitude of the positive capacitive voltage and suppresses the negative portion thereof.

I connect across the capacitance 11 a discharge circuit including a resistance 94 and which includes the contacts of a relay 95. The relay 95 is provided with an actuating coil 96 and contacts 97 and 98, the former of which are connected in series relation with resistance 94. Contacts 98 are connected in series relation with a resistance 99 and when in a closed circuit position establish a discharge circuit across capacitance 91.

I provide an undervoltage indicating and controlling circuit 100 which includes an electric discharge device 101. The voltage responsive circuit 100 is responsive to the voltage of capacitance 11 and is connected to the terminals of capacitance 11 through a voltage divider including resistances 102—106, inclusive. Resistance 103 is provided with an adjustable contact 107 to control the magnitude of the voltage to which capacitance 11 is charged. The power for energizing the anode-cathode circuit of electric discharge device 101 is provided by means of a transformer 108. Electric discharge device 101 transmits energizing current to the actuating coil 109 of a relay 110 when the voltage of the capacitance 11 attains a predetermined value established by the setting of the adjustable contact 107. The potential of the cathode of discharge device 101 is established by means of a glow discharge valve 111 which is connected across a capacitance 112 through a resistance 113. The capacitance 112 is charged from the secondary winding of transformer 108 through an electric valve 114. The electric valve 114 may comprise a pair of electric discharge paths, one of which may be connected across the actuating coil 109 so that substantially constant unidirectional current is transmitted to coil 109. A cathode heating transformer 115 may be employed to energize the filaments of the electric valve 114.

Relay 110 is provided with contacts 116 which control the operation of a relay 117 having contacts 118, 119 and 120 and an actuating coil 121. When the voltage of capacitance 11 attains a predetermined value, relay 110 is operated effecting closure of contacts 118 of relay 117 and if contacts 180 of relay 158 are closed, impresses on grids 32 of rectifiers 29—31 a negative hold-off voltage to maintain the rectifying means 15 completely nonconducting.

I provide an initiating circuit 122 for initiating the charging operation of the capacitance 11. Initiating circuit 122 includes a time delay relay 123 which includes an actuating coil 124 and contacts 125. The actuating coil 124 is connected across circuit 57. The initiating circuit 122 also includes a start or charge switch 126 and a discharge switch 127 which are connected in circuit with actuating coil 96 of relay 95, and which also are connected in circuit with an actuating coil 128 of relay 129. The relay 129 is provided with a pair of sealing-in contacts 130 which are connected around the charge switch 126. Relay 129 also includes a pair of contacts 131 which are connected in series relation with the selector switch 24 so that either switching means 20 or 21 may be energized, depending upon the setting of the selector switch 24.

As a means for rendering the initiating circuit 122 inoperative in the event the voltage of capacitance 11 tends to exceed a predetermined value, I provide an overvoltage protective circuit 132 which includes voltage responsive means, such as a spark gap 133 and a relay 134 having contacts in series relation with switches 126 and 127. Circuit 132 also includes a resistance for dissipating the energy when the spark gap 133 breaks down.

I employ a pair of reversing contactors 135 and 136 connected to a winding section, such as the primary winding, of transformer 8 in order that successive impulses of current transmitted to transformer 8 flow in opposite directions. In this manner, successive impulses of current tend to establish opposing magnetomotive forces and consequently prevent cumulative unidirectional magnetization of the core structure which would otherwise be present if the impulses of current were always transmitted in the same direction through the primary winding. Reversing contactor 135 is provided with power contacts 137 and 138 and control contacts 139, and contactor 136 is provided with power contacts 140, 141 and control contacts 142.

As a means for initiating the conduction of current through primary winding 9 of transformer 8 by the discharge of the capacitance 11, I provide an electric valve means 143 which is preferably of the type employing an ionizable medium, such as a gas or a vapor, and which may include a control member 144 of the immersion-ignitor type. The electric valve means 143 is rendered conducting by transmitting to control member 144 an impulse of unidirectional current and this may be effected by employing a control electric discharge device 145 which is connected to be responsive to the anode voltage of electric valve means 143. The discharge device 145 is provided with a control grid 146 and the discharge device 145 is maintained normally non-conducting by means of a negative unidirectional biasing potential which is impressed on the grid by means of a rectifier circuit including a transformer 147, a rectifier valve 148 and a capacitance 149.

To render electric valve means 143 conducting, the electric discharge device 145 is made to conduct current by impressing a relatively positive voltage on grid 146. This operation is performed by the energization of a transformer 150 which is energized by an impulse of current obtained by connecting its primary winding 151 in circuit with a capacitance 152 which has previously been charged. Upon closure of contacts 119 of relay 117, capacitance 152 discharges through the primary winding of transformer 150 and produces a positive voltage which renders discharge device 145 conducting and consequently renders electric valve means 143 conducting.

In order to limit the magnitude of the reverse voltage of capacitance 11 upon discharge, I connect across the primary winding 9 of transformer 8 an electric valve 153 which is also preferably of the type employing an ionizable medium. The electric valve 153 is rendered conducting by a control electric valve 154 which is connected to be responsive to the polarity of the anode voltage of electric valve 153. As soon as the voltage reverses sufficiently to cause appreciable current to flow through valve 154, electric valve 153 conducts current and thereby limits the magnitude of the reverse voltage of capacitance 11.

I provide a starting circuit 155 which may include a manually operable switch 156 for effecting energization of a relay 157. Closure of the contacts of relay 157 energizes the actuating coil of the control relay 158. Control relay 158 is provided with an actuating coil 159 and contacts 160–164, inclusive. As an interlocking means between the means which exerts mechanical pressure on the work and starting circuit 155, I provide pressure responsive means such as fluid pressure responsive switches 165 having contacts in series relation with the starting switch 156 and contacts 163 of relay 158. The power for energizing the actuating coil of relay 157 is provided by means of transformer 166 which may be energized from circuit 57. A precision switch MS may also be connected in the starting circuit 155 to provide an additional interlocking means so that the discharge of the capacitance 11 is not initiated until the movable electrode 3 and the associated ram are in predetermined positions. The switch MS may be connected to the ram structure by apparatus not shown.

I provide relays 167 and 168 for controlling the energization of the actuating coils for the reversing contacts 135 and 136. The energization of actuating coils for relays 167 and 168 is in turn controlled by relay 169, and auxiliary relays 170 and 171.

I provide a current responsive means, such as a relay 172, which is responsive to the capacitance discharge current which is transmitted through primary winding 9 of transformer 8, and which initiates a series of operations. The relay 172 is designed to open its normally closed contacts 173 and close its normally open contacts 174 almost instantaneously upon the initiation of the condenser discharge, and is also arranged to drop out when the discharge current decreases to a predetermined value. The relay 172 controls the operation of its auxiliary relays 175 and 176.

Relay 176 is provided with contacts 177—180, inclusive, and relay 175 is provided with contacts 181 and 182. Relay 176 performs a number of operations upon energization, one of which is to operate a timing circuit, described hereinafter, through contacts 177, and another of which is to deenergize the actuating coil 121 of relay 117 thereby removing the negative biasing potential from the grids 32 of rectifiers 29—31 by virtue of the operation of contacts 180. Another function of the relay 176 is the deenergization of the actuating coil of relay 167 by means of contacts 179, and a still further function of the relay 176 is to control the energization of the actuating coil of relay 170. Relay 175 controls the energization of the actuating coil of relay 176.

I employ a plurality of timing circuits 183, 184 and 185 which control the sequence of the steps in the welding operation. Circuit 183 may be arranged to operate instantaneously or with a time delay and controls the time at which current is transmitted to the work in response to the operation of the start switch 156. Circuit 184 controls the "hold" time that determines the time during which pressure is applied to the work, and circuit 185 controls the interval of time between successive applications of current and pressure to the work in the event it is desirable to transmit a number of impulses of current to the work. The system may be operated, without using circuit 185, by use of switch 186.

Circuits 183—185, inclusive, are of the type disclosed and broadly claimed in U. S. Letters Patent No. 2,171,347, granted August 29, 1939, upon an application of E. D. Schneider and which is assigned to the assignee of the present application. The circuits 183—185 are similar in construction and arrangement with the exception of the relays 187, 188 and 189 which are respectively connected in the circuits. Each of the circuits operates to effect energization of the associated relays a predetermined interval of time after the application of energizing voltage to the respective circuits.

Considering circuit 183 in particular, means are provided by way of switches 190 and 191 for adjusting the circuit to respond instantly, or to respond with a time lag, upon operation of switch 156. When switch 191 is closed and switch 190 is open, the circuit 183 operates instantaneously; and when switch 190 is closed and switch 191 is open, the circuit operates with a time delay. Relay 187 is provided with contacts 192, 193 and 194. Contacts 192 and 193 are connected to capacitance 152 and control circuit 66 through circuits 195. Contacts 193 serve to close the circuit for connecting the capacitance 152 to transformer 150 to effect discharge of the capacitance through the transformer and to render electric valves 145 and 143 conducting. Contacts 192 are arranged to close the circuit for charging the capacitance 152 from the rectifier of the control circuit 66. Circuit 183, which is representative of circuits 183—185, includes an electric discharge device 196 which is normally biased to the nonconducting condition by impressing on grid 197 thereof a hold-off voltage by means of a capacitance 198 and a voltage divider including resistances 199. A predetermined interval of time after the application of voltage to circuit 183, the hold-off voltage of capacitance 198 decreases sufficiently in magnitude to cause the electric discharge device 196 to conduct current, and consequently current is supplied to the actuating coil of relay 187, causing it to move to the energized position. Upon removal of the energizing voltage from circuit 183, relay 187 moves to its deenergized position.

Relay 188 of hold circuit 184 includes contacts 200—203, inclusive. Contacts 200 and 201 serve to control the time-off circuit 185, when employed, and contacts 202 are interlocking arrangements for controlling circuit 183. Contacts 203 control the energization of actuating coil 159 of relay 158.

A selector switch having contacts 204a and 204b serves as a means for operating the welding machine through its sequence without supplying welding current to the work and for testing the operation of the welding machine and for operating the electrodes. With switch 204 in the welding operating position, its contacts 204a are closed and its contacts 204b are open. In the mechanical operating position, these contacts are open and closed respectively. Contacts 204a open the circuit to relay 168 or 167, preventing discharge of the capacitors through the welding transformer. Contacts 204b allow completion of the actuating coil circuit of relay 175 when relay 187 of circuit 183 operates.

A further selector switch 205 serves as a means to bring the electrodes of the welding machine down on the work for positioning purposes, and then to proceed with the sequence of operation or to raise the electrodes, as desired. With switch 205 arranged so that its contacts 205a and 205b are closed, the sequence of operation proceeds in the normal manner. With switch 205 in the "apply electrode pressure only" position, these contacts are open and relay 158 cannot seal itself around relay 157.

In order to permit the movement of the electrodes 2 and 3 away from the work rapidly after the transmission of the welding current to the work, I employ a contactor 206 having an actuating coil 207 and contacts 208 which when in the closed position short-circuit the secondary winding 10 of welding transformer 8. The contactor 206 is energized by means of contacts 161 of relay 158 to open the short circuit path immediately preceding the welding operation, and to close the short-circuit path near the end of the impulse of current, thereby providing a path for the flow of current due to the inductance of the transformer, and permitting movement of the electrodes away from the work without causing appreciable sparking. A switch 209 may be employed to shunt the contacts of one of the pressure switches 165 and switch MS.

The operation of the embodiment of my invention diagrammatically illustrated in Figs. 1a, 1b and 1c will be explained by considering the system when it is arranged to operate to supply a single impulse of current to the work in response to the operation of the starting switch 156. In order to obtain this control, switch 186 is moved to the open circuit position. When it is desired to effect the transmission of current to the work, as soon as the pressure is applied circuit 183 is arranged to operate instantaneously and switch 191 is closed and switch 190 is open.

Selector switch 24 is moved to either the right or the left to selectively energize either switch 20 or switch 21, which thereby controls the rate at which the capacitance 11 is charged from the supply circuit 14 through rectifying means 15. When switch 20 is closed and 21 is open, the capacitance is charged at a higher rate due to the lower impedance of this circuit. The maximum rate at which current is transmitted to the capacitance 11 is, of course, limited by the reactors 33—35, inclusive, which are connected in series relation with the power transformer 16 and the rectifying means 15. Switch 204 is placed in the welding operating position and switch 205 is placed in the normal operating position; that is, the contacts of these switches are closed. The manually operable switches 25 and 53 are then moved to the closed circuit position.

Closure of switch 53 supplies power to the control circuits and cathode heating elements of the electric valves. Relay 167 is also energized through the normally closed contacts 179 of relay 176 and the normally closed contacts of relay 169, thereby effecting closure of its contacts in the actuating coil circuit of reversing contactor 136. At the end of a time delay interval, such as a five-minute time delay period, to permit the cathodes of the electric valves to attain safe operating temperatures, time delay relay 123 closes its contacts 125 in the initiating circuit 122.

Operation may now be started by manually operating the charging switch 126 in the initiating circuit 122. Closure of switch 126 energizes the auxiliary relay 129 which seals itself in around the charge switch 126, and one contact of which closes to effect energization of the actuating coil of either switch 20 or 21, depending upon the one selected by the position of the selector switch 24. Upon closure of the selected switch, the transformer 16 is energized from the supply circuit 14 thereby permitting the rectifying means 15 to start the charging operation of the capacitance 11. At the same time, relay 95 is energized opening its contacts 97 and 98 thereby opening the discharge path around capacitance 11 and also opening the discharge path which is connected across the indicating circuit including voltmeter 89. As the capacitance 11 attains a predetermined voltage, preselected by the setting of contact 81 of resistance 79, the control circuit 66 reduces the charging rate of capacitance 11 to that value which is just sufficient to maintain the desired voltage. A detailed description of the operation of circuit 66 is given hereinafter. When the capacitor voltage attains a predetermined value, the voltage responsive circuit 100 operates to effect energization of coil 109 of the undervoltage relay 110. Upon operation of relay 110, its contacts 116 in the coil circuit of relay 117 are closed.

The welding machine 1 may now be started by the operator by closing the starting switch 156. Closure of switch 156 energizes relay 157 effecting closure of its normally open contacts. Operation of relay 157 energizes the actuating coil 159 of relay 158 from circuit 57. The circuit through which coil 159 is energized includes the lower terminal of circuit 57, coil 159, contacts 203, contacts of relay 157 and the upper terminal of circuit 57.

Upon operation of the relay 158, closure of its contacts 164 effects energization of the operating solenoid 7 in the fluid system which admits the fluid to the operating mechanism of the welding ram. This starts the movement of the ram down towards the work. A second contact 162 of relay 158 energizes the coil of contactor 136 through the contact of relay 167, previously mentioned, and a normally closed interlock contact of contactor 135. Contactor 136 closes its power contacts 140 and 141 in the circuit between the capacitance 11 and the welding transformer 8, thereby preparing this circuit for the discharge of the capacitance 11. A third set of contacts 161 of relay 158 energizes coil 207 of relay 206, opening the short circuit path across secondary winding 10 of welding transformer 8 to prepare it for operation. A fourth set of contacts 160 of relay 158 seals around the contacts of relay 157; and a fifth set of contacts 163 of relay 158 closes the circuit for effecting application of voltage to timing circuit 183 to prepare it for operation.

As the contacts of relay 157 closed, the actuating coil of relay 117 was energized and this relay sealed itself in around relay 110, provided of course the voltage of capacitance 11 has been maintained at the selected value.

When relay 117 closes its contacts, contacts 118 thereof apply negative bias voltage to grids 32 of rectifiers 29—31, thereby preventing further charging operation of capacitance 11. Contacts 119 of relay 117 close in the circuit of primary winding 151 of transformer 150, thereby preparing the discharge circuit for subsequent completion by relay 187.

As the movable electrode 3 is moved downwardly by the ram, it places the electrodes on the work and applies pressure thereto. Upon the ram reaching the proper position, the switch MS is closed. If the contacts of the pressure switches 165 are also closed, indicating the presence of sufficient fluid pressure, relay 187 of timing circuit 183 is energized without time delay and effects operation of its contacts. Contacts 192 are opened, thereby opening the charging circuit for capacitance 152, and contacts 193 are closed completing the circuit for the discharge of the capacitance 152 through the primary winding 151 of transformer 150, through contacts 119 of relay 117. Capacitance 152 upon discharge induces a positive impulse of voltage in the secondary of transformer 150.

This impulse of voltage introduced in the secondary winding of transformer 150 is sufficient to overcome the negative bias voltage impressed on grid 146 of control electric valve 145 to cause this valve to conduct current and thereby transmit an impulse of energizing current to the control member 144 of electric valve 143. As a result, the capacitance 11 is discharged through the primary winding 9 of transformer 8 through the following circuit: the circuit including the actuating coil of relay 172, contacts 141 of contactor 136, the primary winding 9, contact 140 and the anode-cathode circuit of electric valve 143. This discharge current develops in the welding transformer the voltage and current which produces a weld in the work being processed. As the discharge operation proceeds, if the load circuit is sufficiently inductive to tend to produce an oscillatory discharge the voltage across capacitance 11 tends to reverse, thereby raising the potential of the anode of electric valve 153 to cause the electric valve 153 to conduct current. Of course, since its control valve 154 is connected to the anode, the valve 154 conducts current, first effecting the transmission of energizing current to the control member thereof and subsequently rendering valve 153 conducting. Under these conditions, the electric valve 153 conducts current and limits the inverse voltage of capacitance 11 to a low value established by the current maintaining voltage of the valve. The welding transformer 8 continues to dissipate energy due to the operation of electric valve 153.

As the discharge of capacitance 11 takes place, the current responsive relay 172 is energized opening its normally closed contacts 173 and closing its normally open contacts 174, effecting energization of the coil of auxiliary relay 175, which closes contacts 181 in the actuating coil circuit of relay 176 and seals itself in around the contacts of relay 172 by means of contacts 182.

The capacitor discharge continues and as the charging current decreases near the end of the impulse the relay 172 drops out inasmuch as it is designed to move to the deenergized position when the discharge current decreases to a predetermined value. Upon dropping out, relay 172 closes its contacts 173 and effects energization of the actuating coil of relay 176.

Upon operation, relay 176 closes its normally open contacts 177 to apply energizing voltage to the hold timing circuit 184 and starts the hold time operation. Normally closed contacts 180 of relay 176 are open to deenergize the coil 121 of relay 117, thereby opening the contacts 118 of the latter relay and removing the hold-off or bias voltage from grids 32 of rectifiers 29—31, thereby permitting a subsequent charging operation of capacitance 11 by rectifying means 15. A second normally closed contact 179 of relay 176 is open to deenergize relay 167 which in turn opens its contacts, effecting deenergization of the actuating coil for contactor 136. Contacts 140 and 141 of contactor 136 thereby open the circuit for primary winding 9 at a relatively low value of current. A second normally open contact 178 of relay 176 closes the actuating coil circuit of auxiliary relay 170. One normally open contact of relay 170 closes to energize the coil of auxiliary relay 169 which seals itself in around the contact of relay 170 through a normally open contact. A normally open contact of relay 179 is also actuated, thereby opening the actuating coil circuit of relay 167 and closing that of relay 168.

At the completion of the timing interval established by circuit 184, relay 188 is moved to the energized position. A normally open contact 200 is closed to seal this timing circuit around one contact of relay 176, and the second normally open contact closes to energize the off-time relay 185 when switch 186 is in the closed or repeat position. Since it has been assumed that switch 186 is in the open circuit position or the non-repeat position, the circuit 185 is ineffective. A normally closed contact 203 of relay 188 opens the circuit for the actuating coil 159 of relay 158 which thereby moves to the deenergized position. By so operating, relay 158 performs the following operations: deenergizes the timing circuit 183 and relay 187; opens the sealing circuit around relay 157; opens the actuating coil of contactor 136 which was previously opened by relay 167 however; opens the actuating coil circuit of relay 206; and opens the circuit for energizing the solenoid 7. Upon closure of contacts 209 of contactor 206, the secondary winding of transformer 8 is short-circuited, thereby permitting the electrode 3 to rise without involving sparking between electrodes 2 and 3. A second normally closed contact of relay 188 opens a circuit to deenergize relays 175 and 176. One normally closed contact of relay 176, that is, contact 180, closes in the coil circuit of relay 117 to prepare the system for re-operation. A second normally closed contact 179 of relay 176 completes the coil circuit of relay 167 which closes its contacts in the coil circuit of contactor 135.

Normally open contact 178 of relay 176 opens the circuit of relay 170 which drops out. Relay 169 remains energized through its sealing contact, however, and a normally closed contact of relay 170 energizes the coil of auxiliary relay 171 which seals itself around the contact of 170 and closes a normally open contact in the circuit, shunting the coil of relay 176.

No further operation occurs so long as relay 157 is energized, since relay 188 is sealed in and its contacts prevent closure of relay 158 thereby preventing the reinitiation of the sequence. As soon as the operator releases the relay 157 by opening switch 156, relay 188 drops out releasing its sealed-in circuit, and upon reclosure of its 157 by operating switch 156 the sequence relay 157 by operating switch 156 the sequence again proceeds in the same manner as above stated with the exception that contactor 135 is now energized through the contacts of relay 168. Therefore, the capacitance 11 discharges through the primary winding 9 in the reverse direction due to the fact that power contacts 137 and 138 are closed and power contacts 140 and 141 are open. When relay 170 is energized, one of its normally open contacts completes a short circuit around the coil of relay 169 which now drops out to restore the circuits of 167 and 168 to their original condition and removes the seal around the contact of relay 170. When relay 170 drops out upon the opening of relay 176, the coil of relay 171 is deenergized and relays 169—171 are restored to their initial positions.

With switch 186 in the repeat position, upon energization of relay 187 the off-time relay 185 starts to time and upon completion of its timing operation opens its normally closed contact in circuit with relay 188. Relay 188 is thereby deenergized and transfers its contacts to permit relay 158 to reclose and repeat the operations so long as relay 157 is maintained energized by the closure of the starting switch 156. At any time that the relay 157 is open during the sequence of control, the operation will proceed until relay 158 is deenergized at which time operation will cease until relay 157 is reclosed.

If, when relay 158 closes, the voltage of capacitance 11 is below the preselected value, the contact 116 of relay 110 will not be closed and relay 117 will not operate. Should the voltage of capacitance 11 attain the desired value before switch MS closes, however, relay 117 will operate and the sequence will proceed normally. If, however, the capacitance does not attain the desired value of voltage before MS closes, the open contacts of relay 117 in the circuit for primary winding 151 of transformer 150 prevents discharge initiation, and since relay 172 is not energized further operation of the equipment is prevented and manual means must be used to clear the machine. This manual means is effected by moving switch 205 to the "apply electrode pressure only" position and releasing relay 157 by operation of the switch 156. This permits relay 158 to drop out without carrying through the usual sequence of operation. When using air or hydraulic operated welding machines in which no provision is made for initiating the discharge of capacitance 11 by the position of the moving electrode or the position of the ram which operates the electrode, switches 190 and 209 are closed and switch 191 is open. This arrangement effectively shunts the fluid initiating circuit and places circuit 183 in a condition to operate its contacts at definite adjustable times after relay 158 operates. The sequence of operations proceeds exactly as explained above with the exception that the discharge of capacitance 11 is initiated at a definite time after the pressure is exerted on the work, and that in the event the capacitance voltage is below the predetermined value when discharge is attempted the machine will pause with the electrodes in the welding position until the proper voltage is reached. When the proper voltage is attained, the welding operation will proceed in the normal manner.

Selector switch 24 serves as an arrangement for selecting a rapid or slow charging rate for capacitance 11. Selector switch 204 provides a means for operating the welding machine through its sequence without welding when it is desired to test the machine for operation and for adjusting the electrodes by bringing the electrodes together in a hammer action. With switch 204 in the welding position, its contacts 204a are closed and its contacts 204b are open. In the mechanical operating position, these contacts are opened and closed respectively. Contacts 204a open the circuit to contactor 135 or 136, preventing discharge of capacitance 11 through the welding transformer. Contacts 204b allow completion of actuating coil circuit of relay 175 when circuit 183 operates. Since relay 175 is energized, it causes the relay 176 to operate exactly as though relay 172 had operated in the usual manner and the sequence of mechanical operation proceeds in the normal manner.

Selector switch 205 provides an arrangement for bringing the electrodes of the welding machine 1 down on the work for positioning purposes and for raising the electrodes as desired. The solenoid 7 may be energized and deenergized at will by operation of the starting switch 156 with the contacts of selector switch 205 in the open circuit position. Of course, since contacts 205b are open, discharge of the capacitance 11 is prevented because the contacts of relay 187 are in a position to prevent the transmission of an energizing impulse of current to transformer 150.

If, during the positioning operation, the electrodes are properly applied to the work and it is desired to continue without removing the electrodes therefrom, switch 205 is moved to the normal operation position and the sequence proceeds in the normal manner.

The operation of the control circuit 66 with respect to the rectifying means 15 will now be considered. The amount of current transmitted to the capacitance 11 by the rectifying means 15 is controlled by a number of factors including the circuits which energize the primary winding of transformer 16 and the resultant voltage which is impressed on grids 32 of rectifiers 29—31. When circuit 18 is connected the charging rate is substantially lower than when circuit 17 is employed due to the fact that circuit 18 includes resistances 19. In addition, the maximum charging rate is limited by means of the series connected reactors 33—35.

The amount of current transmitted by the rectifying means 15 is determined in a measure by the resultant voltage impressed on grids 32. This resultant voltage includes two components, one of which is a variable biasing voltage and the other of which is a periodic voltage of triangular wave form. The latter component of voltage is produced by excitation circuits 36—38 and the variable unidirectional component is produced by control circuit 66. The magnitude of the biasing voltage impressed on grids 32 varies from positive to negative throughout the charging period of the capacitance 11. During the initial portion of the charging period the biasing voltage is a relatively high positive value due to the fact that electric discharge device 67 is biased to cut-off. As the charging operation proceeds, discharge device 67 begins to conduct current through resistance 68 and varies the potential of grids 32 to cause the rectifiers 29—31 to conduct a smaller amount of current.

This selective operation of the control circuit 66 in response to the magnitude of the capacitance voltage is obtained by comparing a predetermined component of voltage derived from the capacitance with a fixed reference voltage. Glow discharge valve 84 provides the constant reference voltage which is compared with a component of voltage obtained from resistance 79 which is connected in a voltage divider across the capacitance 11. Resistances 86 and 87 provide an arrangement for the comparison of these two voltages and the difference thereof is impressed on grid 69 of discharge device 67. It will be noted that the potential applied to grid 69 varies from a high negative value with zero capacitance voltage to a positive value as the potential of the capacitance is raised.

When the capacitance is discharged, the discharge device 67 is biased to cut-off and practically all of the supply voltage provided by the rectifier circuit of circuit 66 appears across this discharge device, placing a high positive bias on control grids 32 of rectifiers 29—31. When this condition prevails, the capacitance 11 is charged at a relatively high rate limited by reactors 33—35 and either circuit 17 or 18. As the capacitance 11 is charged, the negative potential derived from the voltage divider connected across the capacitance rises, but since the voltage of circuit 66 is comparatively large, the grids 32 of rectifiers 29—31 are maintained positive until the discharge device 67 comes into operation. At a point in the rise of potential of the capacitance, the voltage impressed on grid 69 reaches a sufficiently low negative value to permit this discharge device to conduct current. Upon further rise of capacitance voltage, this discharge device increases its current and consequently decreases the positive voltage applied to grids 32 due to the drop in voltage in resistance 68. At some point along this line, the increased negative voltage derived from the capacitance and the decreased potential across discharge device 67 results in a sufficient negative voltage on grids 32 to bias rectifiers 29—31 to cut-off, thereby stopping the charging operation. As the charge of capacitance 11 leaks off, a point is reached at which the negative bias on grids 32 is sufficiently reduced to permit the rectifiers 29—31 to again conduct and restore the voltage of the capacitance 11 to the desired value. In this manner, the capacitance voltage is always maintained at a predetermined value to assure uniformity of the weld.

Adjustment of the capacitance voltage may be obtained by means of contact 81 of resistance 79. With the contact 81 at the lowermost position, the maximum capacitance voltage is required to bias the rectifiers 29—31 to cut-off and, conversely, with the contact 81 at the uppermost position the capacitance voltage is minimum.

Capacitances 59a, 59b and resistances 60 constitute an anti-hunting circuit to assure stable operation of the rectifier during the charging operation. The capacitance 59a in combination with resistances 60 serves to eliminate the hunting action by limiting the rate of rise of the bias potential as the contacts 118 of relay 117 are opened to start the rectifier. In this manner accurate phase control of the resultant grid voltage of rectifiers 29—31 is obtained even during the first few cycles of the charging operation. Capacitor 59b is connected to prevent overshooting of the voltage to which capacitance 11 is charged. That is, the capacitance 59b introduced a stabilizing effect by decreasing the conductivities of the rectifiers 29—31 directly in proportion to the rate at which the voltage of capacitance 11 rises, thereby preventing overshooting of the capacitance voltage.

In connection with the indicating circuit including voltmeter 89, it will be noted that the presence of the rectifier 90 assures that the voltmeter 89 indicates only the positive or forward voltage of capacitance 11, and the charging circuit including capacitance 91 and the resistance 92 tends to stabilize the voltage which is impressed across the terminals of the voltmeter 89. Furthermore, contacts 98 of relay 95 close a discharge path to the capacitance 91 to discharge the capacitance 91 and reset the indicating circuit.

Referring now to the circuit which transmits the energizing impulse of current to transformer 150, capacitance 152 is charged by utilizing a voltage derived from the right-hand portion of control circuit 66. It will be noted that the normally closed contacts 192 of relay 187 close the charging circuit for capacitance 152 and that the capacitance 152 is charged from the circuit including capacitance 83 and glow discharge valve 84. Upon operation of relay 187 in circuit 183, the charging circuit for capacitance 152 is opened by means of normally closed contacts 192 and the discharge circuit is closed by means of contacts 193. Of course, in order to effect the discharge of capacitance 192, contacts 119 of relay 117 must be closed. In other words, the negative or biasing voltage is impressed on grids 32 by closure of contacts 118, thereby preventing the rectifying means 115 from operating during the discharge of capacitance 11.

One of the important advantages of apparatus built in accordance with my invention is the arrangement by which the impulses of current are reversed in direction relative to the power or welding transformer, so that cumulative unidirectional magnetization is prevented in this manner effecting a substantial uniformity in the character of the welds produced by the currents. Furthermore, the connection of electric valve means 143 in series relation with reversing contactors 135 and 136 relieves the duty imposed on the reversing contactors by the initiation of the condenser discharge which is obtained by controlling the conductivity of this electric valve means so that the reversing contactors are not required to initiate the heavy current due to the discharge of capacitance 11. Although the reversing contactors are required to interrupt a relatively low value of current near the end of each impulse, the magnitude of this current is not sufficiently great to deleteriously affect the life of the contacts of these contactors.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a capacitance subjected to variations in potential and reversals of polarity, an indicating circuit comprising an indicating instrument connected in series relation with a rectifier across said capacitance, a damping circuit connected across said indicating instrument including in series relation a second capacitance and a resistance, and a discharge circuit for discharging said second capacitance.

2. In combination, a capacitance, means for charging said capacitance, means for discharging said capacitance, an indicating circuit comprising an indicating instrument, a rectifier in series relation with said instrument so that said instrument indicates only voltage of one polarity impressed across said capacitance, a damping circuit connected across said instrument including in series relation a resistance and a second capacitance, a discharge circuit for said second capacitance, and means for controlling said discharge circuit.

3. In combination, an alternating current supply circuit, a capacitance, an inductive discharge circuit for said capacitance, an indicating circuit including an indicating instrument connected in series relation with a rectifier across said capacitance, a damping circuit for said instrument including in series relation a resistance and a second capacitance, and a discharge circuit for discharging said second capacitance.

4. In combination, a capacitance, means for charging said capacitance, a load circuit, means for discharging said capacitance to effect energization of said load circuit, an indicating circuit comprising an indicating instrument connected in series relation with a rectifier across said capacitance, a damping circuit connected across said indicating instrument and including in series relation a second capacitance and a resistance, and means for discharging said second capacitance.

5. In combination, a capacitance, means for charging said capacitance, an oscillatory discharge circuit for said capacitance, means for initiating discharge of said capacitance, and an indicating circuit comprising an indicating instrument connected in series relation with a rectifier across said capacitance and a damping circuit connected across said indicating instrument.

6. In combination, a capacitance, means for charging said capacitance, a load circuit, an oscillatory circuit connected between said capacitance and said load circuit and comprising means for discharging said capacitance therethrough, and an indicating circuit selectively responsive to the voltage of said capacitance incident to the charge of said capacitance established by said means and comprising an indicating instrument connected in series relation with a rectifier across said capacitance.

7. In combination, a supply circuit, a capacitance, means for charging said capacitance from said supply circuit, a load circuit, a discharge circuit for said capacitance connected between said capacitance and said load circuit and comprising an appreciable inductance which with said capacitance tends to produce an oscillatory discharge, an indicating circuit selectively responsive to the voltage of said capacitance incident to the charging operation and comprising an indicating instrument connected in series relation with a rectifier across said capacitance, a damping circuit connected across said indicating instrument including in series relation a second capacitance and a resistance, and a discharge circuit for discharging said second capacitance.

8. In combination, a supply circuit, a capacitance, means for charging said capacitance from said supply circuit, a load circuit, means connected between said capacitance and said load circuit and comprising appreciable inductance thereby tending to make the discharge circuit for said capacitance oscillatory, means for initiating discharge of said capacitance, an indicating circuit selectively responsive to the voltage of said capacitance incident to the charging operation and comprising an indicating instrument connected in series relation with a rectifier across said capacitance, a discharge circuit connected across said indicating instrument including in series relation a second capacitance and a resistance, a discharge circuit for said second capacitance, and means responsive to said initiating means for controlling said discharge circuit.

GEORGE L. ROGERS.